(12) United States Patent
Jung et al.

(10) Patent No.: US 10,987,757 B2
(45) Date of Patent: Apr. 27, 2021

(54) REFRIGERATOR AND APPARATUS FOR FABRICATING THE SAME

(71) Applicants: LG ELECTRONICS INC., Seoul (KR); UNIST (Ulsan National Institute of Science and Technology), Ulsan (KR)

(72) Inventors: Wonyeong Jung, Seoul (KR); Deokhyun Youn, Seoul (KR); Jangseok Lee, Seoul (KR); Hyungson Ki, Seoul (KR)

(73) Assignees: LG ELECTRONICS INC., Seoul (KR); UNIST (Ulsan National Institute of Science and Technology), Ulsan (KR)

( * ) Notice: Subject to any disclaimer, the term of this patent is extended or adjusted under 35 U.S.C. 154(b) by 240 days.

(21) Appl. No.: 15/771,186

(22) PCT Filed: Aug. 2, 2016

(86) PCT No.: PCT/KR2016/008525
§ 371 (c)(1),
(2) Date: Apr. 26, 2018

(87) PCT Pub. No.: WO2017/073891
PCT Pub. Date: May 4, 2017

(65) Prior Publication Data
US 2018/0326535 A1    Nov. 15, 2018

(30) Foreign Application Priority Data

Oct. 29, 2015 (KR) .................... 10-2015-0151204
Oct. 29, 2015 (KR) .................... 10-2015-0151256

(51) Int. Cl.
*B23K 26/08* (2014.01)
*F25D 23/06* (2006.01)
(Continued)

(52) U.S. Cl.
CPC ............ *B23K 26/08* (2013.01); *B23K 26/123* (2013.01); *B23K 26/127* (2013.01);
(Continued)

(58) Field of Classification Search
CPC .... B23K 26/08; B23K 26/244; B23K 26/123; B23K 26/127; B23K 26/206; B23K 26/28;
(Continued)

(56) References Cited

U.S. PATENT DOCUMENTS

2007/0084553 A1    4/2007  Nakajima et al.

FOREIGN PATENT DOCUMENTS

CN        1603728        4/2005
JP        2002-225139    8/2002
(Continued)

OTHER PUBLICATIONS

Machine Translation of Jung, KR 10-2012-0139648, performed Jul. 7, 2020 (Year: 2012).*
(Continued)

*Primary Examiner* — Brian W Jennison
(74) *Attorney, Agent, or Firm* — Ked & Associates, LLP

(57) ABSTRACT

A refrigerator includes a vacuum adiabatic body including a conductive resistance sheet providing a vacuum space that has a temperature between a temperature of an internal space and a temperature of an external space and is in a vacuum state, the conductive resistance sheet capable of resisting heat conduction between a first plate and a second plate, wherein at least one of the conductive resistance sheet and each of the first and second plates are welded to each other to create a welding part, wherein a plurality of regular beads are provided to a surface of the welding part, and wherein the plurality of regular beads includes: a parabolic inflection region provided at a center portion; linear regions respec-
(Continued)

tively provided at both outsides of the inflection region; and edge regions respectively provided at outsides of the linear regions.

17 Claims, 9 Drawing Sheets

(51) Int. Cl.
    *B23K 37/04*     (2006.01)
    *B23K 26/12*     (2014.01)
    *B23K 26/20*     (2014.01)
    *B23K 26/28*     (2014.01)
    *B23K 26/244*     (2014.01)
    *B23K 101/12*     (2006.01)

(52) U.S. Cl.
    CPC .......... *B23K 26/206* (2013.01); *B23K 26/244* (2015.10); *B23K 26/28* (2013.01); *B23K 37/0435* (2013.01); *F25D 23/06* (2013.01); *B23K 2101/12* (2018.08); *F25D 2201/14* (2013.01); *F25D 2500/02* (2013.01)

(58) Field of Classification Search
    CPC .. B23K 37/0435; B23K 35/362; B23K 35/36; B23K 35/28; B23K 35/282; B23K 35/3607; F28F 19/02; F28F 21/084; F28F 21/089; F28F 9/26; F25B 39/04; F25B 39/02

See application file for complete search history.

(56) References Cited

FOREIGN PATENT DOCUMENTS

| | | |
|---|---|---|
| JP | 2007-218509 | 8/2007 |
| JP | 2008-114420 | 5/2008 |
| JP | 2013-079789 | 5/2013 |
| JP | 2015-000411 | 1/2015 |
| KR | 10-2005-0065088 | 6/2005 |
| KR | 10-0808125 | 2/2008 |
| KR | 10-2012-0139648 | 12/2012 |
| KR | 10-2017-0016188 | 2/2017 |

OTHER PUBLICATIONS

Machine Translation of Hirakuni (JP 2007-218509), performed Jul. 7, 2020 (Year: 2007).*
Machine Translation of Hamaguchi (JP 2015-000411), performed Jul. 7, 2020 (Year: 2015).*
Chinese Office Action dated Nov. 18, 2019 issued in CN Application No. 201680064926.4.
International Search Report and Written Opinion dated Nov. 21, 2016 issued in Application No. PCT/KR2016/008525.
European Search Report dated Apr. 30, 2020 issued in EP Application No. 20153039.1.

* cited by examiner

[Fig. 1]
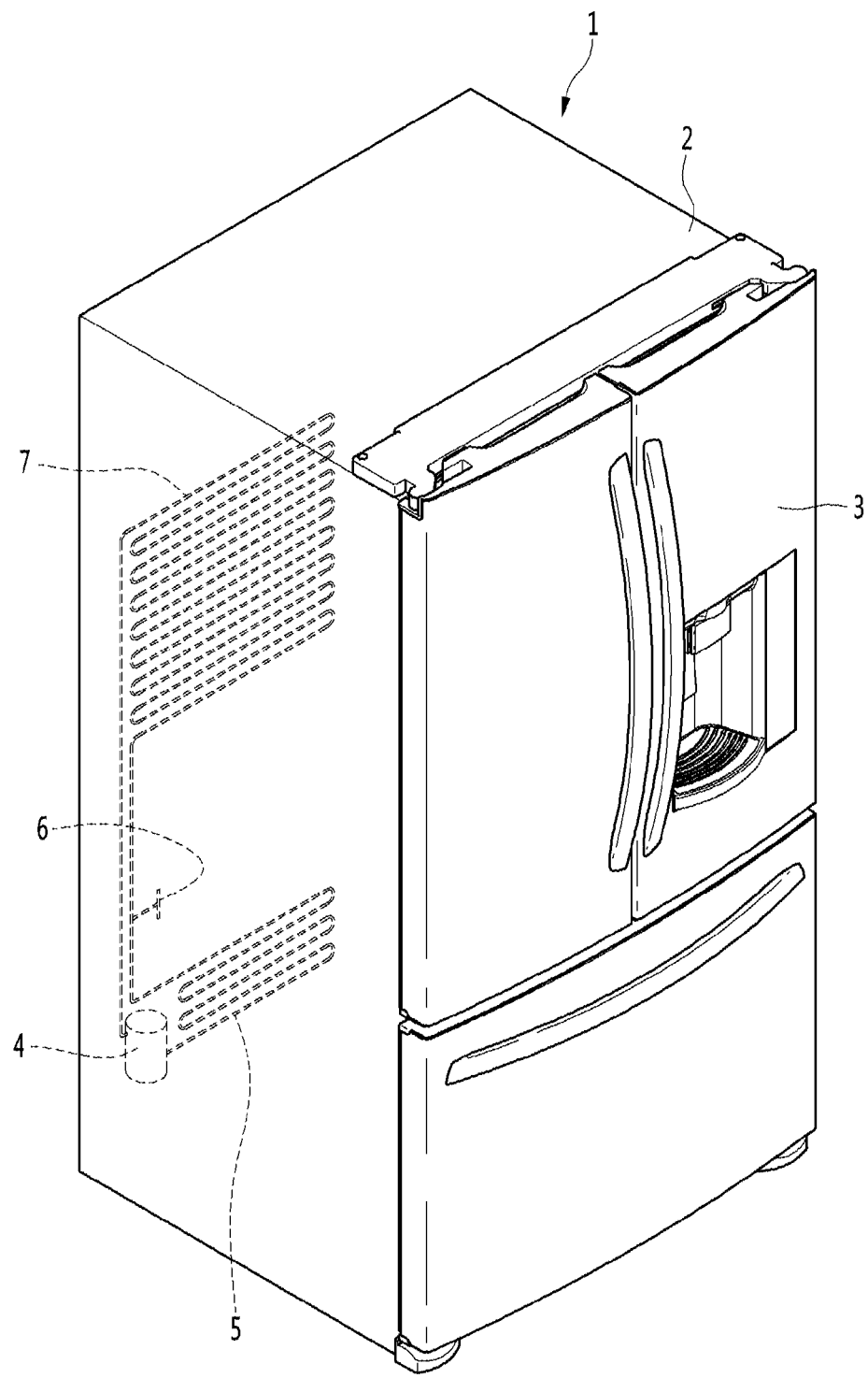

[Fig. 2]
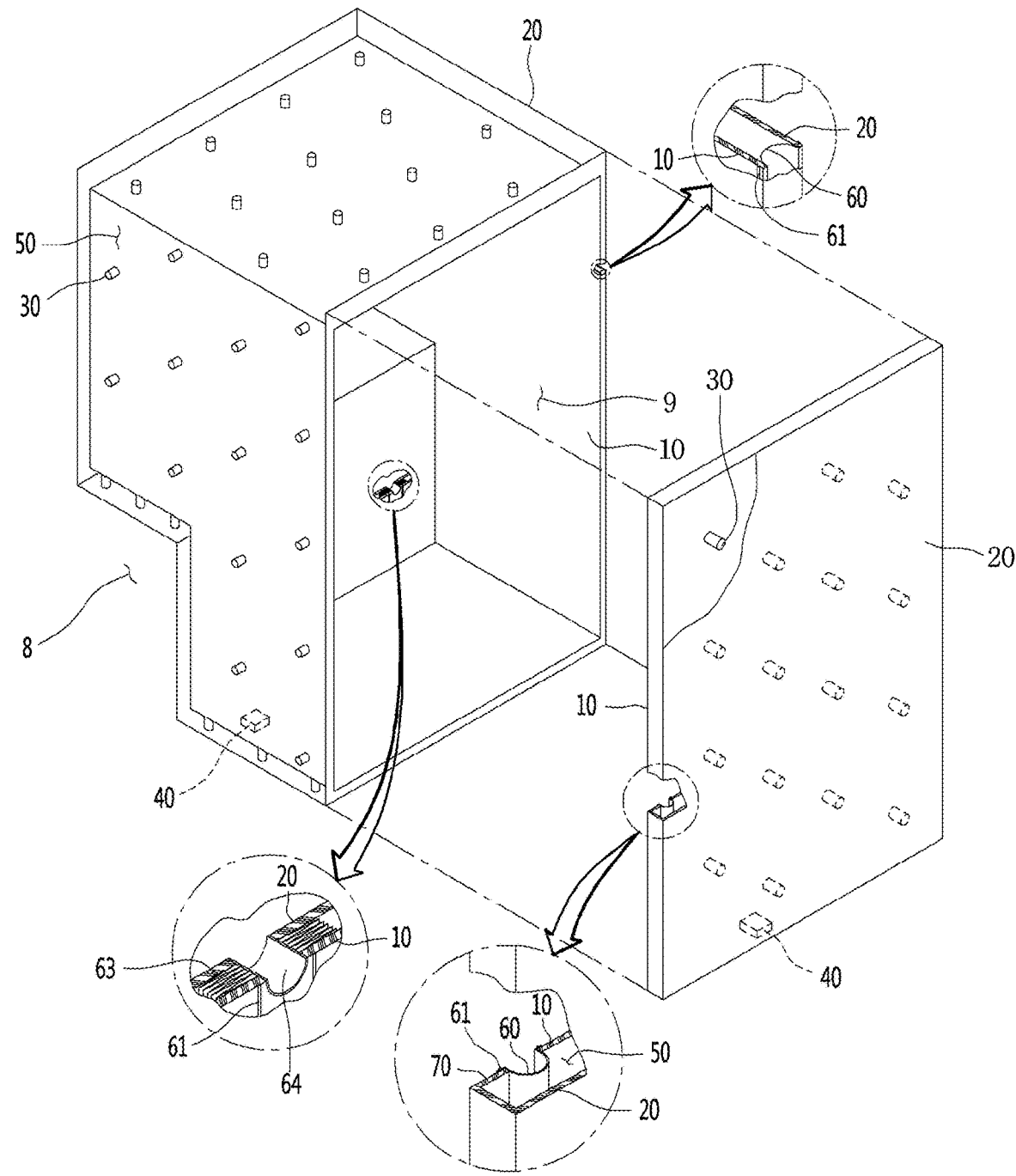

[Fig. 3]
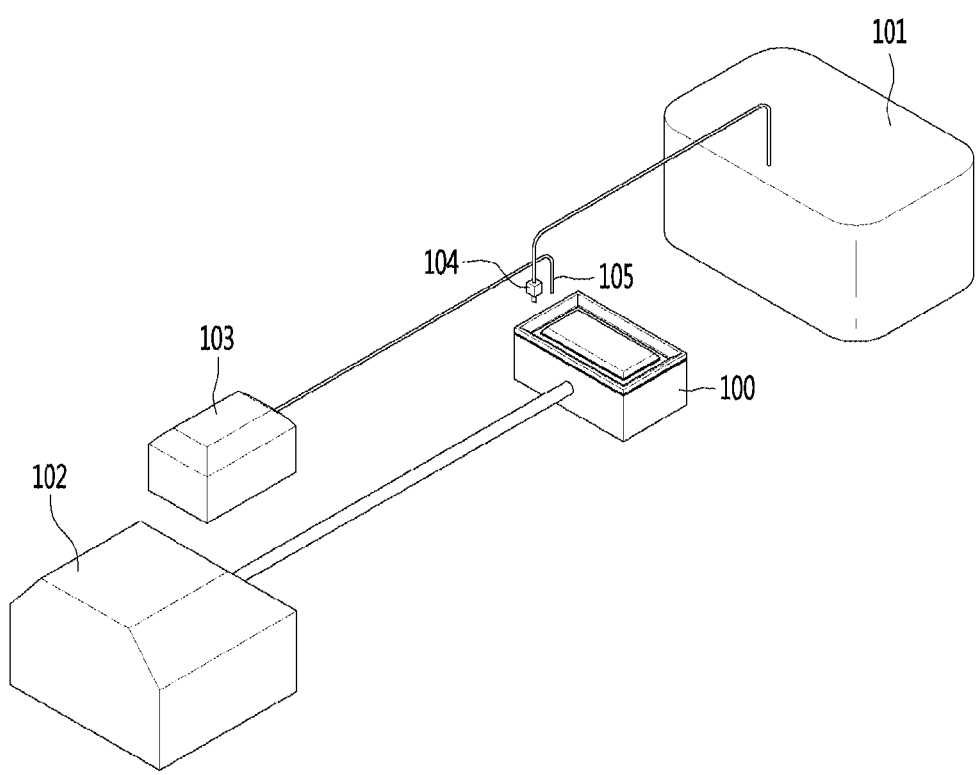

[Fig. 4]
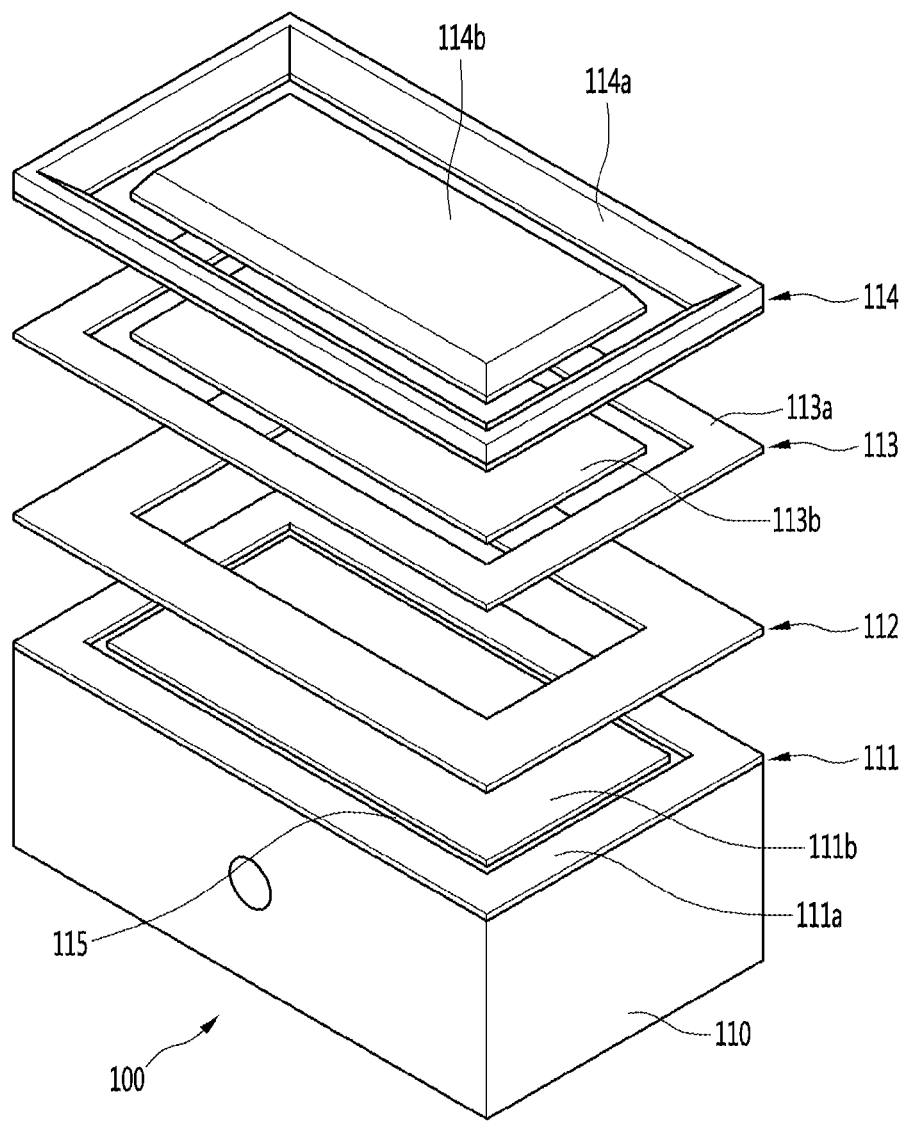

[Fig. 5]
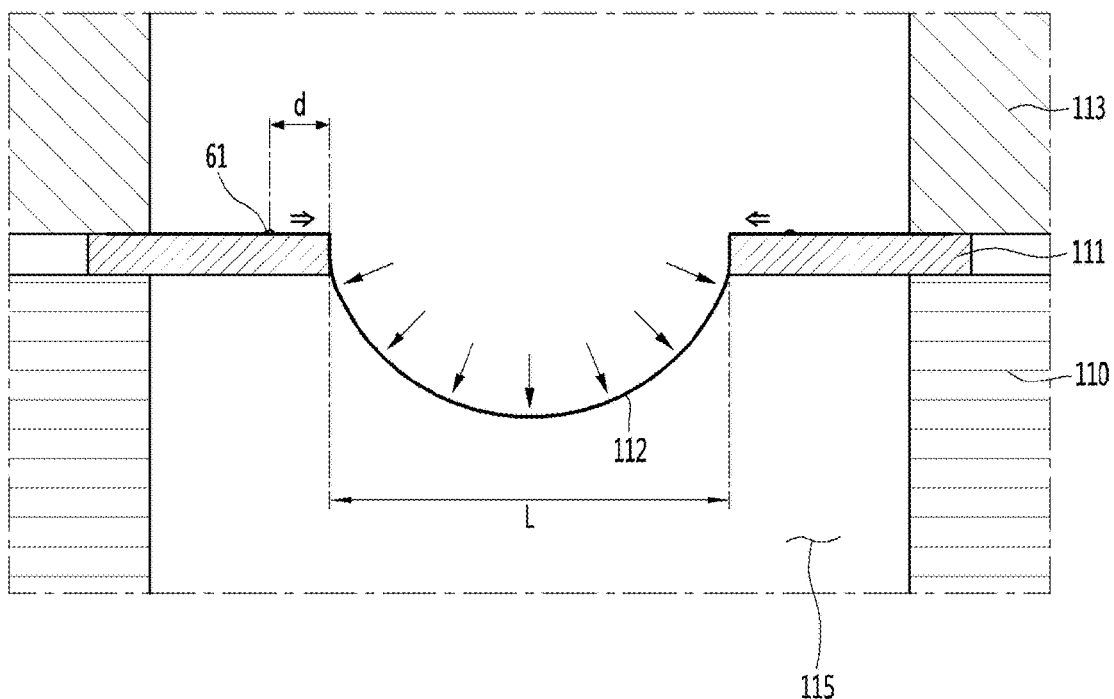
[Fig. 6]
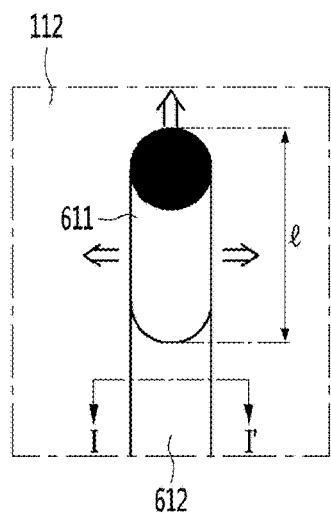
[Fig. 7]
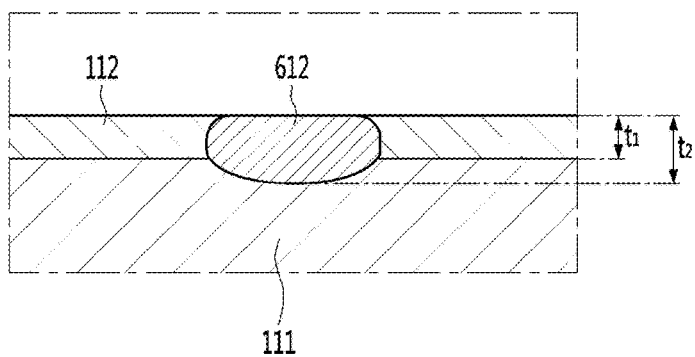

[Fig. 8]
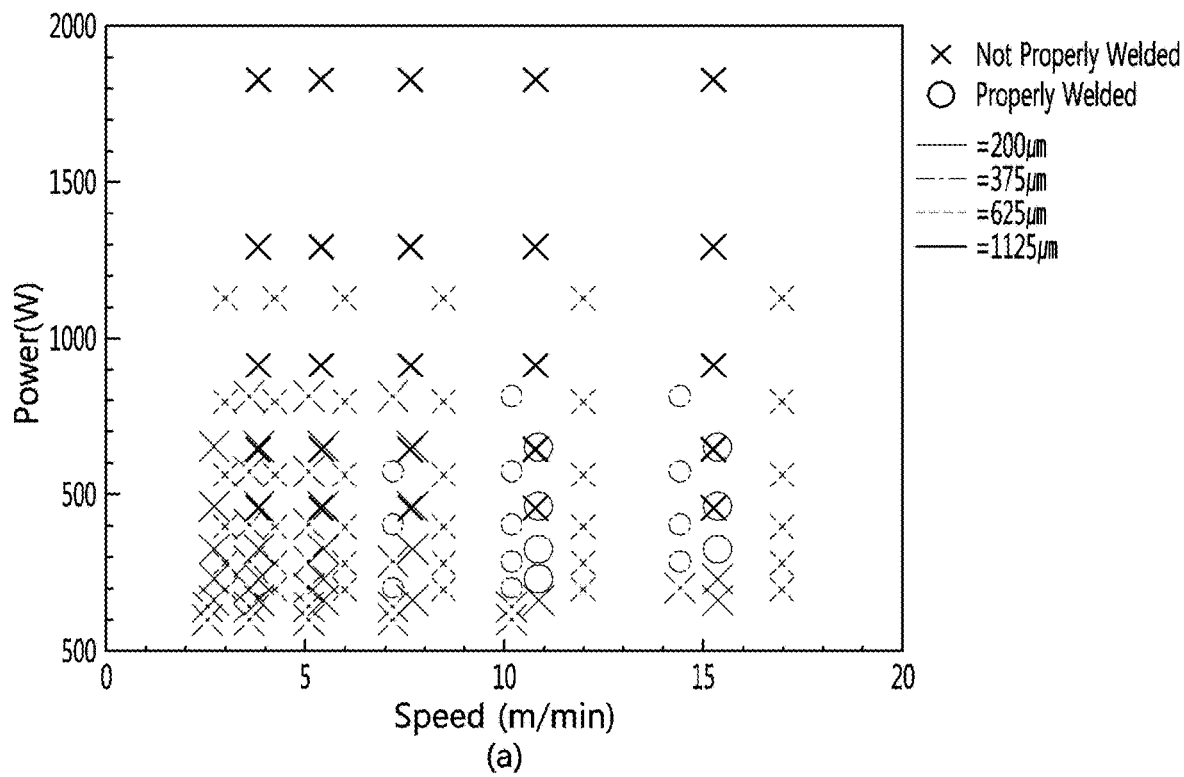
(a)
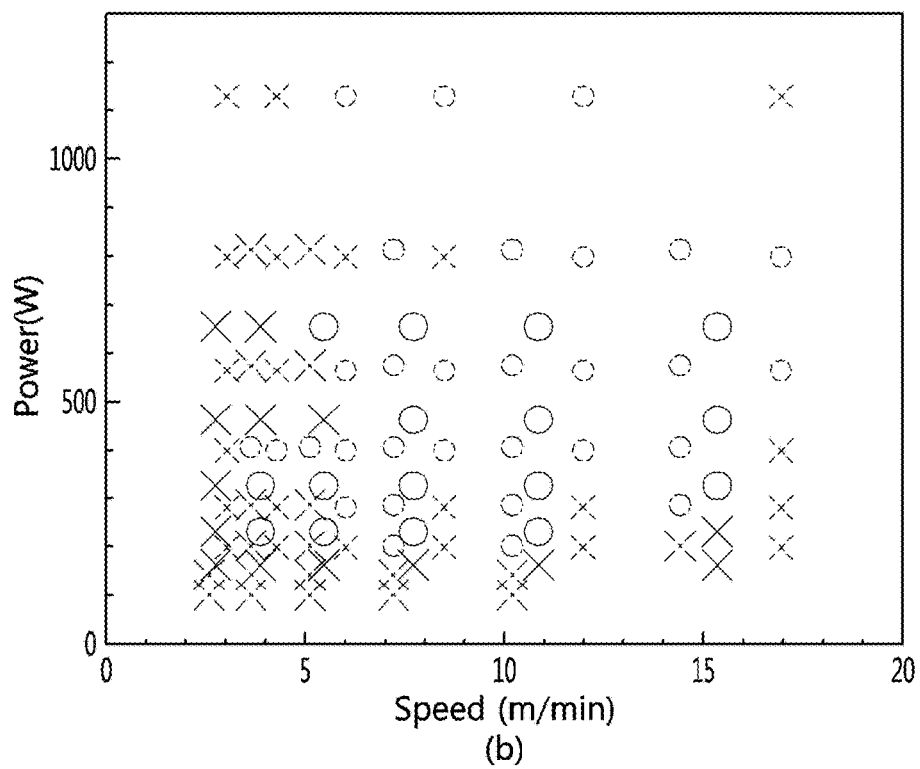
(b)

【Figure 9】
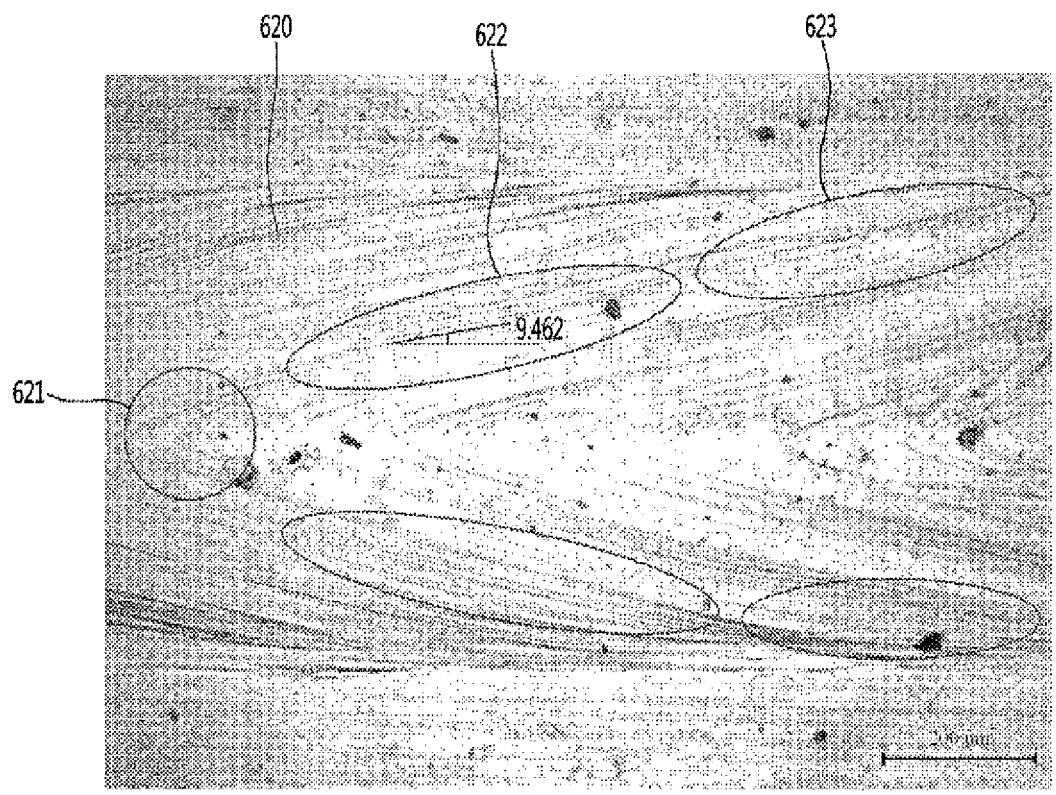
【Figure 10】
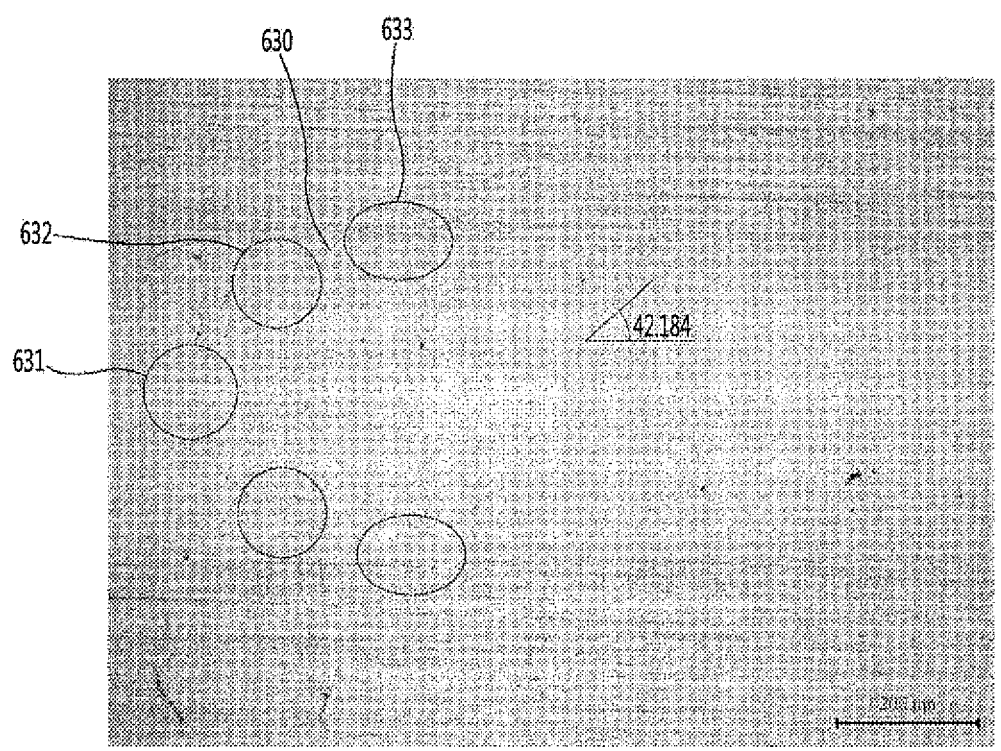

[Fig. 11]
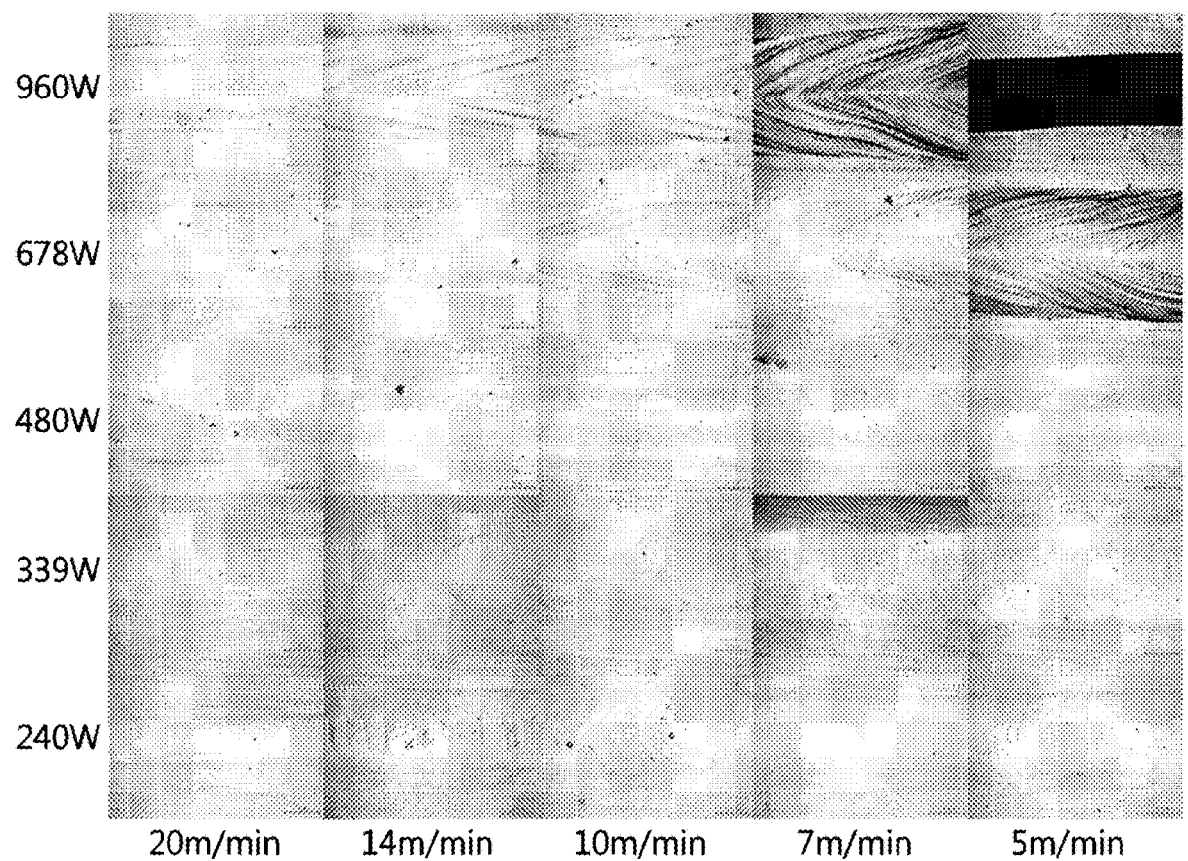
[Fig. 12]
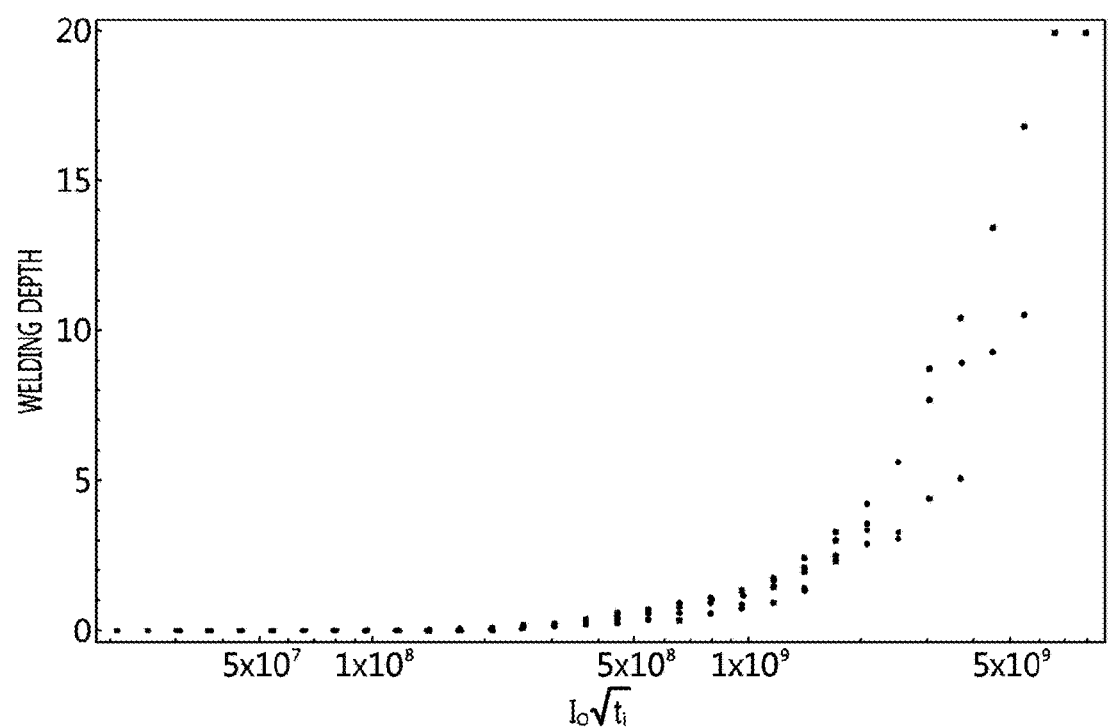

[Fig. 13]
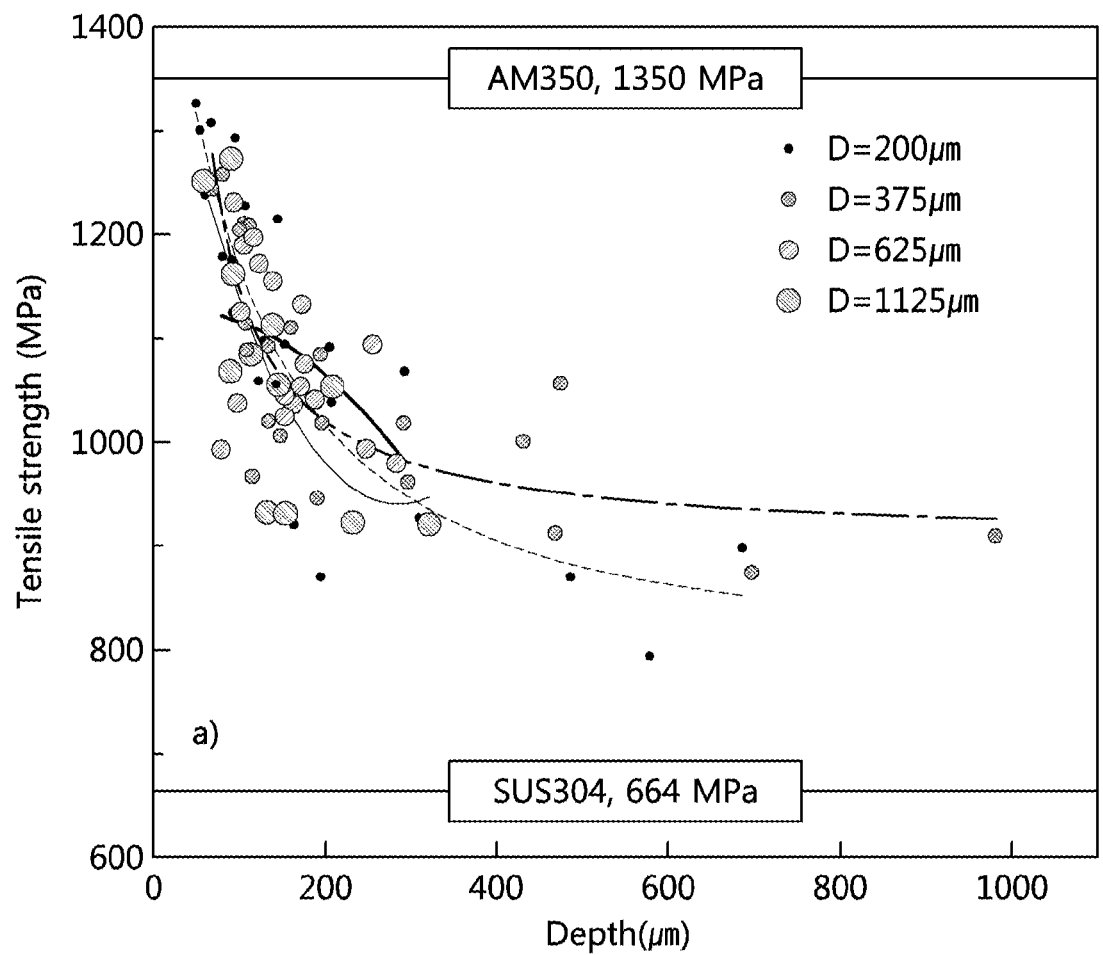

REFRIGERATOR AND APPARATUS FOR FABRICATING THE SAME

CROSS-REFERENCE TO RELATED PATENT APPLICATIONS

This application is a U.S. National Stage Application under 35 U.S.C. § 371 of PCT Application No. PCT/KR2016/008525, filed Aug. 2, 2016, which claims priority to Korean Patent Application Nos. 10-2015-0151204 and 10-2015-0151256, both filed Oct. 29, 2015, whose entire disclosures are hereby incorporated by reference.

TECHNICAL FIELD

The present disclosure relates to a refrigerator and an apparatus for fabricating the same, and more particularly, to a refrigerator using a vacuum adiabatic body and an apparatus for fabricating the same.

BACKGROUND ART

In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator. The vacuum adiabatic body is a structure of which inside is provided as a vacuum space part to reduce a heat transfer amount. For example, a refrigerator to which a vacuum adiabatic body is applied has been disclosed in Korean Patent Application No. 10-2015-0109624 (Reference Document) which was applied by the present inventor. In the Reference Document, there is disclosed a structure in which a conductive resistance sheet is provided in a gap part between a first plate member and a second plate member, which contact internal and external spaces of the refrigerator so as to provide the vacuum adiabatic body. The conductive resistance sheet has a thin thickness and hence can resist heat conduction between the first and second plate members.

The conductive resistance sheet is provided such that its thickness is one-several tenth of that of the plate member so as to resist the heat conduction. In order to provide the vacuum space part in a vacuum state, a fastening part between the conductive resistance sheet and the plate member should be in a sealing state. In other words, the plate member and the conductive resistance sheet having a considerably smaller thickness than the plate member should be fastened to each other to be in the sealing state. As a method satisfying this condition, a method of welding the fastening part between the conductive resistance sheet and the plate member may be preferably considered.

The welding between the plate member and the conductive resistance sheet is considerably difficult due to a difference in thickness between the plate member and the conductive resistance sheet. For example, even when a gap between the two members is very narrow, the plate member (hereinafter, may be referred to as a plate) is not melted even though the thin conductive resistance sheet is melted, or a molten liquid is not filled between the two members. Therefore, there occurs a problem that the conductive resistance sheet and the plate do not contact each other. The problem may occur at all points at which the plate and the conductive resistance sheet contact each other. Although a sealing failure occurs at a specific point, the entire vacuum adiabatic body cannot be used as a failure.

The present inventor has made various attempts and efforts such that welding sealing between a conductive resistance sheet and a plate is performed, thereby achieving the present disclosure. More particularly, embodiments provide a refrigerator and an apparatus for fabricating the same, which can ensure perfect welding performance at all welding points between a plate and a conductive resistance sheet, and can stably maintain sealing such that loss does not occur at any specific point, thereby improving fabrication yield.

In one embodiment, a refrigerator includes: a main body provided with an internal space in which storage goods are stored; and a door provided to open/close the main body from an external space, wherein at least one of the main body and the door includes a vacuum adiabatic body, wherein the vacuum adiabatic body includes: a first plate member defining at least one portion of a wall for the internal space; a second plate member defining at least one portion of a wall for the external space; and a conductive resistance sheet providing a vacuum space part that has a temperature between a temperature of the internal space and a temperature of the external space and is in a vacuum state, the conductive resistance sheet capable of resisting heat conduction between the first plate member and the second plate member, wherein at least one of the conductive resistance sheet and each of the first and second plate members are welded to each other to provide a welding part, wherein a plurality of regular beads are provided to a surface of the welding part, and wherein the bead includes: a parabolic inflection region provided at a center portion; linear regions respectively provided at both outsides of the inflection region; and edge regions respectively provided at outsides of the linear regions. The angle made by the linear region and a welding direction may be 9 to 43 degrees.

The number of beads may be 20 to 100 per 1 mm, based on the welding direction. The beads may be regularly provided.

The thickness of each of the first and second plates melted to be provided to the welding part may be 0.1 to 3 times of that of the conductive resistance sheet. The welding part may be provided through laser welding. As a control condition of the laser welding, the size of a laser beam may be 200 to 375 μm, the moving speed of the laser beam may be 7 to 15 m/min, and the power of the laser beam may be 200 to 800 W.

In another embodiment, a refrigerator includes: a main body provided with an internal space in which storage goods are stored; and a door provided to open/close the main body from an external space, wherein at least one of the main body and the door includes a vacuum adiabatic body, wherein the vacuum adiabatic body includes: a first plate member defining at least one portion of a wall for the internal space; a second plate member defining at least one portion of a wall for the external space; and a conductive resistance sheet providing a vacuum space part that has a temperature between a temperature of the internal space and a temperature of the external space and is in a vacuum state, the conductive resistance sheet capable of resisting heat conduction between the first plate member and the second plate member, wherein at least one of the conductive resistance sheet and each of the first and second plate members are welded to each other to provide a welding part, wherein the welding part is provided through laser welding as conduction mode welding, and wherein the thickness of each of the first and second plates melted at the welding part is 0.1 to 3 times of that of the conductive resistance sheet.

In order to provide the welding part, the moving speed of a laser beam may be 7 to 15 m/min, and the power of the laser beam may be 200 to 800 W. A bead provided to a surface of the welding part may include at least linear regions.

The conductive resistance sheet may have a thickness of 10 to 200 μm, and each of the first and second plate member may have a thickness of 500 to 2000 μm. The thickness of each of the first and second plates may be provided to be 10 to 100 times of that of the conductive resistance sheet.

In still another embodiment, a refrigerator includes: a main body provided with an internal space in which storage goods are stored; and a door provided to open/close the main body from an external space, wherein at least one of the main body and the door includes a vacuum adiabatic body, wherein the vacuum adiabatic body includes: a first plate member defining at least one portion of a wall for the internal space; a second plate member defining at least one portion of a wall for the external space; and a conductive resistance sheet providing a vacuum space part that has a temperature between a temperature of the internal space and a temperature of the external space and is in a vacuum state, the conductive resistance sheet capable of resisting heat conduction between the first plate member and the second plate member, wherein at least one of the conductive resistance sheet and each of the first and second plate members are welded to each other to provide a welding part, and wherein a ratio (d/L) of a distance (d) from the welding part to an end of each of the first and second plate members to a distance (L) of the conductive resistance sheet exposed to the vacuum space part is equal to or greater than 0.6.

The ratio (d/L) of the distance (d) from the welding part to an end of each of the first and second plate members to the distance (L) of the conductive resistance sheet exposed to the vacuum space part may be equal to or smaller than 1. The conductive resistance sheet exposed to the vacuum space part may form a curved part to increase heat resistance. The welding part may be provided in two lines through laser welding. The laser welding may be performed as conduction mode welding.

In still another embodiment, an apparatus for fabricating a refrigerator includes: a laser source providing a laser beam; a jig supporting base materials provided as plate members constituting the refrigerator and a thin plate capable of resisting heat conduction between the plate members, the jig enabling the base material and the thin plate to be welded to each other by irradiating the laser beam applied from the laser source; and a vacuum pump applying a vacuum pressure to the jig, wherein the jig includes: a base having a groove through which the vacuum pressure is applied to the thin plate; and a cover provided opposite to the base, wherein the cover includes: a rigid body cover; and an elastic body cover interposed between the rigid body cover and the thin plate.

An inert gas source may be further provided to inject an inert gas into a place onto which the laser beam is irradiated. The elastic body cover may be made of PDMS or rubber. The elastic body cover may be provided in the shape of an O-ring. The elastic body cover may support the thin plate by pressing the thin plate in the shape of a closed curve.

The elastic body cover and the base material may be provided as a pair at inner and outer sides, and the elastic body cover may support the thin plate by pressing the thin plate including an edge.

According to the present disclosure, it is possible to provide a vacuum adiabatic body capable of maintaining sufficient sealing. Also, it is possible to provide a refrigerator capable of performing a reliable operation.

The details of one or more embodiments are set forth in the accompanying drawings and the description below. Other features will be apparent from the description and drawings, and from the claims.

DESCRIPTION OF DRAWINGS

FIG. 1 is a perspective view of a refrigerator according to an embodiment.

FIG. 2 is a schematic view showing a vacuum adiabatic body used in a main body and a door of the refrigerator.

FIG. 3 is a configuration view of an apparatus used in fabrication of the refrigerator.

FIG. 4 is an exploded perspective view of a jig.

FIG. 5 is an enlarged sectional view showing a peripheral portion of a groove.

FIG. 6 is a plan view showing a welding part while a welding process is being performed.

FIG. 7 is a section view taken along line I-I' of FIG. 6.

FIG. 8 illustrates tables showing results obtained by performing leakage and rupture experiments on samples obtained after welding is performed.

FIG. 9 illustrates the shape of a solidified part when the width and thickness of a molten part are large.

FIG. 10 illustrates the shape of a solidified part when the width and thickness of a molten part are small.

FIG. 11 illustrates shapes of solidified parts as results obtained by performing an experiment while changing the power and moving speed of a laser beam using a beam size of 200 μm.

FIG. 12 is a graph showing depths of the welding part with respect to energy per unit area.

FIG. 13 is a graph showing tensile strengths with respect to depths of the welding part.

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

In the refrigerator, parts constituting a freezing cycle may be included in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at which conductive resistance sheets 60 and 63 are provided are schematically illustrated for convenience of understanding.

Referring to FIG. 2, the vacuum adiabatic body includes a first plate member 10 providing a wall for a low-temperature space, a second plate member 20 providing a wall for a high-temperature space, and a vacuum space part 50 defined as a gap part between the first and second plate members 10 and 20. Also, the vacuum adiabatic body includes the conductive resistance sheets 60 and 63 for blocking heat conduction between the first and second plate members 10 and 20. A welding part 61 for sealing the first and second plate members 10 and 20 is provided such that the vacuum space part 50 is in a sealing state.

When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. The wall for each space may serve as not only a wall directly contacting the space but also a wall not contacting the space. For example, the vacuum adiabatic body of the embodiment may also be applied to a product further having a separate wall contacting each space.

Factors that cause the loss of an adiabatic effect of the vacuum adiabatic body are heat conduction between the first and second plate members 10 and 20, heat radiation between the first and second plate members 10 and 20, and gas conduction of the vacuum space part 50.

Among these factors, the heat conduction between the first and second plates 10 and 20 can be blocked by the conductive resistance sheets 60 and 63. Also, each of the conductive resistance sheets 60 and 63 is fastened to each of the plate members 10 or 20 or a side frame 70 by the welding part 61, and the welding part 61 completely performs sealing, thereby maintaining the vacuum state. Each of the plate members 10 and 20 and the side frame 70 serves as a base member to which each of the conductive resistance sheets 60 and 63 provided as a thin plate is welded.

Hence, hereinafter, each of the plate members 10 and 20 and the side frame 70 may be referred to as a base material. Similarly, each of the conductive resistance sheets 60 and 63 may be referred to as a thin plate. For example, the thin plate may have a thickness of 10 to 200 μm, and the base material may have a thickness of 500 to 2000 μm. Preferably, the thickness of the base material may be ten to hundreds times greater than that of the thin plate. This is for the purpose of obtaining an effect of heat conduction resistance.

In the embodiment, the inside of the vacuum space part 50 can be maintained in a stable and perfect sealing state by the welding part 61. To this end, the welding part 61 is to have no leakage by maintaining the sealing state and to have a strength with which the sealing part 61 can resist stress caused by the vacuum pressure of the vacuum space part 50.

Such characteristics of the welding part 61 may be achieved by creating an apparatus for providing the welding part. Three problems in providing the welding part to be firm and stable are as follows. First, a jig allowing the thin plate and the base material to be adhered closely to each other does not fulfill its function. For example, when the jig does not allow the thin plate and the base material to be completely adhered closely to each other by entirely pressing a gap part between the thin plate and the base material because the flatness of the jig is not uniform, at a portion at which the thin plate and the base material are not adhered closely to each other, only the thin plate is melted by a laser beam, but the base material is not melted, or a molten liquid is not filled in the gap part, which may become a cause of leakage.

Second, when surfaces of the thin plate and the base material are rough or when scratches are generated on the surfaces of the thin plate and the base material, irradiation of the laser beam is not completely performed. Hence, the thin plate and the base material are not locally melted, or the molten liquid is not filled in the gap part between the thin plate and the base material. Therefore, a welding failure may occur. Third, when a foreign substance such as dust exists on a welding surface between the thin plate and the base material, the foreign material is burned by the laser beam, and the molten liquid is boiled by the burned gas, or incompletely burned ashes are mixed with the molten liquid. Therefore, a welding failure may occur.

The performance of the welding part 61 may be changed by characteristics of the laser beam irradiated from a head 104 (see FIG. 3) together with the characteristics of the welding part 61. For example, if the irradiation amount of the laser beam is large, a large amount of the thin plate and the base material is melted, and therefore, the strength of the welding part may be weakened. If the power of the laser beam is low, the thin plate and the base material are not welded to each other. If the power of the laser beam is high, the volume of the welding part is increased, which it not preferable.

Hereinafter, an apparatus for fabricating the refrigerator, which is provided to solve the above-described problems, will be described. FIG. 3 is a configuration view of an apparatus used in fabrication of the refrigerator.

Referring to FIG. 3, the apparatus includes a jig 100 supporting the conductive resistance sheet 60 and 63, the plate members 10 and 20, and the side frame 70, a laser source 101 providing a laser beam applied to the jig 100, a vacuum pump 102 applying a vacuum pressure to the jig 100, and an inert gas source 103 applying an inert gas to the jig 100. A 2 kW multi-mode fiber laser may be used as the laser source 101, and a laser beam may be applied to the thin plate and the base material through the head 104. The inert gas source 103 may allow the inert gas to be introduced at a portion at which the laser beam is irradiated through a nozzle 105, using a predetermined pipeline.

In the embodiment, argon is used as the inert gas. In addition, the spray angle of the nozzle 105 is 45 degrees, the height between the nozzle 105 and a laser irradiation point is 6 mm, and the diameter of the nozzle 105 is 8 mm. The inert gas suppresses the burning of a foreign substance and an oxidation phenomenon, thereby preventing a welding failure.

It is important to allow the laser source 101 and the head 104 to irradiate a laser beam having power sufficient to weld the thin plate and the base material to each other. As a laser control conditions capable of achieving this object, a power of the laser beam, an irradiation area of the laser beam, and a moving speed of the laser beam, i.e., a moving speed of the head may serve as control factors of the laser beam.

FIG. 4 is an exploded perspective view of the jig. Referring to FIG. 4, the jig 100 includes a base 110 and covers 113 and 114, and a base material 111 and a thin plate 112 may be placed between the base 110 and the covers 113 and 114. In other words, the base material 111 and the thin plate 112 are placed at an appropriate position at which they are to be welded to each other on the base 110, and the covers 113 and 114 cover the base 110 including the base material 111 and the thin plate 112.

A groove 115 is provided in the base 110, and a vacuum pressure from the vacuum pump 102 may be applied through the groove 115. The thin plate 112 is placed in the groove 115 to provide a force pulling the thin film 112 downward based on this figure. The base material 111 is provided under the thin plate 112. In this case, the base material 111 may be provided with an inner base material 111b and an outer base material 111a, which are respectively welded to an inside and an outside of the thin plate 112.

The inner base material 111b and the outer base material 111a are spaced apart from each other, and the thin plate 112 may be placed into a structure in which it covers a gap between the inner base material 111b and the outer base material 111a. Therefore, a sound pressure applied through the groove 115 may be applied to the thin plate 112. The first plate member 10 may be exemplified as the inner base material 111b, and the second plate member 20 may be exemplified as the outer base material 111a.

An inner elastic body cover 113b and an inner rigid body cover 114b are provided as covers pressing a portion at which the inner base material 111b and the thin plate 112 overlap with each other. An outer elastic body cover 113a and an outer rigid body cover 114a are provided as covers pressing a portion at which the outer base material 111a and the thin plate 112. Referring to the above-described configuration, it can be seen that welding is performed at each of the outside and inside. Also, the outside and inside can be simultaneously welded using two heads 104. Accordingly, it is possible to improve work efficiency.

The vacuum pressure is applied to the thin plate 112 through the groove 115, so that the thin plate 112 can be completely attached to the base material 111. In other words, the sound pressure applied through the groove 115 pulls the thin plate 112, so that the thin plate 112 can be adhered closely to the base material 111. Thus, it is possible to prevent a gap that may be generated between the thin plate 112 and the base material 111 due to local deformation or dimensions of the thin plate 112 or the base material 111. In addition, a foreign substance such as dust between the thin plate 112 and the base material 111 is removed due to a strong flow generated by the sound pressure. Thus, the foreign substance cannot interfere with the welding.

The thin plate 112 and the base material 111 may be further adhered closely to each other by a force with which the elastic body cover 113 uniformly presses the thin plate 112 and the base material 111. Hereinafter, this will be described in detail.

The covers 113 and 114 are provided with the rigid body cover 114 applying an entire pressing force and the elastic body cover 113 placed under the rigid cover 114 to entirely uniformly apply the force of the rigid body cover 114 to the base material 111 and the thin plate 112. The elastic body cover 113 may be made of PDMS or rubber. The elastic body cover 113 may be provided in the shape of an O-ring, instead of a quadrangular shape shown in this figure. The elastic body cover 113 is appropriately deformed along the entire shape of the base material 111 and the thin plate 112, to uniformly press the thin plate 112. Here, the term 'entire shape' means that a height difference in a vertical direction, i.e., a pressed direction based on this figure is entirely observed. Thus, the adhesion between the thin plate 112 and the base material 111 can be further improved. In other words, the elastic body cover 113 is deformed along the entire shape of the base material 111 that is not deformed without a force of a certain level or more, so that the thin plate 112 can be completely adhered closely to the base material 111.

It is advantageous that it is unnecessary to replace the rigid body cover 114 due to the elastic body cover 113. Specifically, since the adhesion between the thin plate and the base material may be influenced by even a small scratch of the rigid body cover 114, scratches may be generated on the surfaces of the thin plate and the base material due to repetitive use of the rigid body cover 114, and therefore, it is required to replace the thin plate and the base material. However, since the elastic body cover 113 is soft, any scratch is not generated, and the elastic body cover 113 is deformed by itself even when a scratch is generated. Thus, the elastic body cover 113 has no influence on the contact between the base material and the thin plate.

The elastic body cover 113 is more preferably provided to have a structure entirely surrounding the welding part. In other words, the elastic body cover 113 supports the thin plate 112 in the shape of a closed curve entirely surrounding the outside of the thin plate 112, so that any welding failure with respect to a small point of the welding part 61 cannot occur. In order to improve sealing performance, the closed curve may be provided in the shape of a closed curved surface having a thick line. For example, the entire region of the thin plate 112 may be pressed by the elastic body cover 113 toward an end portion of the welding part in any one direction.

The thin plate 112 and the base material 111 can be more completely adhered closely to each other by the vacuum pressure applied through the groove 115 together with that the thin plate 112 and the base material 111 are mechanically adhered closely to each other. At this time, although a slight gap exists between the thin plate 112 and the base material 111, the thin plate 112 further approaches the base material due to a static pressure with a strong flow rate, caused by external air introduced through the gap, and the gap between the thin plate 112 and the base material 111 does not substantially become a degree to which the gap interferes with the welding.

FIG. 5 is an enlarged sectional view showing a peripheral portion of the groove. An operation of the apparatus according to the embodiment will be described in detail.

Referring to FIG. 5, the thin plate 112 serving as each of the conductive resistance sheet 60 and 63 may be placed in a gap of the base material 111 in a state in which a curved part provided to increase a heat conduction path is placed in the groove 115, thereby performing welding. The welding parts 61 may be provided at both side portions of the thin plate 112. It can be easily assumed that the welding part 61 will be provided long in the vertical direction on the paper surface of this figure.

Since the vacuum pressure from the vacuum pump 102 is applied to the groove 115, there is generated a force moving downward from the surface of the thin plate 112 based on this figure. Arrows indicate forces applied to the thin plate 112. The force applied to the thin plate 112 generates a force pulling both ends of the thin plate 112 in the middle direction. The direction of arrows indicates a direction of the force applied to both ends of the thin plate 112. The force acts as a factor that causes a welding failure while the welding is being performed. This will be described in detail with reference to the accompanying drawings.

FIG. 6 is a plan view showing the welding part while a welding process is being performed. Referring to FIG. 6, while welding is being performed as a heat source such as a laser relatively moves with respect to the thin plate 112 and the base material 111, there exist a portion at which the thin plate 112 and the base material 111 are melted by the heat source to become a molten liquid and a portion at which contact portions of the thin plate 112 and the base material 111 are adhered to each other as the molten liquid is solidified.

In this figure, based on the advancing direction of the heat source, there are shown a molten part 611 at which the molten liquid to be welded exists and a solidified part 612 provided by solidifying the molten part 611. The molten part 611 is a part at which the molten liquid is provided in a liquid state, and may be provided to have a predetermined length 1. However, the molten part 611 does not sustain a force pulling the molten part 611 at the left and right sides of the molten part 611, and other parts, i.e., a portion that is not still melted and the solidified part 61 are to sustain the force.

In other words, a force widening the molten part 611 along the length 1 of the molten part 611 is generated by the vacuum pressure of the groove 115. If the molten part 611 is widened by the force in the left-right direction based on this figure, a non-uniform flow of the molten liquid, and therefore, a part that is not locally welded or an empty gap is generated, which results in leakage. It will be apparent that the molten part 611 is not widened but may be indirectly supported by the solidified part 612 and the portion that is not melted. However, this depends on the entire length of the molten part 611. For example, when the length 1 of the molten part 611 is minutely small, the molten part 611 is minutely widened, which has no influence on welding performance. However, when the length 1 of the welding part 611 is considerably long, the widening of the molten part 611 along the length 1 cannot be neglected.

FIG. 7 is a section view taken along line I-I' of FIG. 6. Referring to FIG. 7, the solidified part 612 is made of a separate material having a different property from the thin plate 112 and the base material 111, and has a lower strength than the thin plate 12 and the base material. Therefore, in a relationship between a thickness t1 of the thin plate 112 and a thickness t2 of the solidified part 612, the thickness of the solidified part 612 is preferably provided as thin as possible. However, when a laser beam having a weak power is used such that the thickness of the solidified part 612 is provided thin, there may be generated a portion that is not locally welded, which is not preferable. The control of a laser beam to achieve the above-described object will be described later.

The solidified part 612 is substantially the same as the welding part 61. The solidified part 612 may refer to a welding part after the molten part 611 is solidified.

Referring back to FIG. 5, a force with which the welding part 61 is widened in the left-right direction at the molten part 611 and a configuration provided to resist the force will be described in detail. A force pulling in the center direction at the welding part is generated by the vacuum pressure in the thin plate 112. It can be seen that the pulling force is in proportion to a length L of the curved part of the thin plate 112 to which the vacuum pressure is applied. A static frictional force generated at a gap from the welding part 61 to a front end of the base material 111 is generated as a force corresponding to the pulling force. If the static frictional force is larger than the pulling force generated by the vacuum pressure, any welding failure caused by the molten part 611 does not occur.

The frictional force may be in proportion to a pressure with which the thin plate 112 presses the base material 111 and a distance d from the welding part 61 to the front end of the base material 111. The pressure between the thin plate 112 and the base material 111 may correspond to a difference between the atmospheric pressure and the pressure between the two members. Therefore, the pressure may be in proportion to the static pressure of a fluid flowing in the gap.

Alternatively, when both ends of the thin plate 112 are completely sealed by the elastic body cover 113, the vacuum pressure of the groove 115 may be applied to the gap part between the thin plate 112 and the base material 111 without flow of the fluid. Thus, as the distance d from the welding part 61 to the front end of the base material 111 is increased, the frictional force can be increased. However, since the vacuum adiabatic body is provided in the refrigerator, the frictional force acts as a factor increasing the amount of heat transfer between the base material 111 and the thin plate 112, which is not preferable.

Under such circumstances, the present inventor has performed an experiment on various cases. In the experiment, an airtightness test for determining whether leakage occurs determines the occurrence of leakage with respect to a vacuum of about 10 to 11 Torr. The airtightness test determines that no leakage occurs only in a case where no leakage occurs when the same experiment is performed twice.

Table 1 shows results of the experiment.

TABLE 1

| L (mm) | d (mm) | L/d | Quality |
|---|---|---|---|
| 2 | 8 | 0.25 | Leakage |
| 2 | 6 | 0.33 | Leakage |
| 3 | 8 | 0.38 | Leakage |
| 3 | 6 | 0.5 | Leakage |
| 4 | 8 | 0.5 | Leakage |
| 4.5 | 8 | 0.56 | Leakage |
| 5 | 8 | 0.63 | Good quality |
| 4 | 6 | 0.67 | Good quality |
| 4.5 | 6 | 0.75 | Good quality |
| 5 | 6 | 0.83 | Good quality |
| 5.5 | 6 | 0.92 | Good quality |

Referring to Table 1, it can be seen that, if a length d of a portion to which the frictional force is applied/a length L of a portion to which the vacuum pressure is applied becomes a certain level or more, i.e., 0.6 or more, any welding failure caused by the molten liquid does not occur. Here, the length d of the portion to which the frictional force is applied may be defined as a distance from the welding part 61 to the end of the base material 111, and the length L of the portion to which the vacuum pressure is applied may be defined as a length of the thin plate exposed to the vacuum space part to have the vacuum pressure applied thereto.

As already described above, if the length d of the portion to which the frictional force is applied is increased, the amount of heat conduction is increased after the refrigerator using the vacuum adiabatic body is fabricated, and therefore, heat loss is increased. Hence, the length d of the portion to which the frictional force is applied/the length L of the portion to which the vacuum pressure is applied is preferably limited to a maximum of 1. According to the experiment, d/L may be more preferably provided to be equal to or greater than 0.63 and equal to or smaller than 0.92.

When the welding part 61 is provided, mode welding is preferably provided as conduction mode welding. Specifically, the mode welding in laser welding includes conduction mode welding and keyhole mode welding (or beam hole). First, in the conduction mode welding, the depth of a melted material is relatively shallow, and the width of a melted portion is wider than the depth of the melted portion. In this case, the power density of a laser beam is relatively low. In the keyhole mode welding, the power density of the laser beam is equal to or greater than any threshold value, and evaporation of the melted material is intensified.

At this time, a depression (keyhole) is generated in the melted material due to a reaction force caused by metal steam pressure, thereby performing welding. Since the inside of the material is directly heated through the depression, deep welding can be obtained. In this case, the welding part 61 is preferably provided in the conduction mode welding so as to reduce the widening of the molten part 611 as the length of the molten part 611 is formed as short as possible.

As a laser control conditions capable of achieving the conduction mode welding and providing the stable and firm welding part 61, a power of the laser beam, an irradiation area of the laser beam, and a moving speed of the laser beam, i.e., a moving speed of the head may serve as control factors of the laser beam. An experiment has been performed on various cases while changing the laser beam irradiated from the head. Hereinafter, results obtained by performing the experiment will be described.

FIG. 8 illustrates tables showing results obtained by performing leakage and rupture experiments on samples obtained after welding is performed. Part (a) shows a result obtained by performing the rupture experiment, and Part (b) shows a result obtained by performing the leakage experiment.

Referring to FIG. 8, first, × indicates that a leakage or rupture occurs. Here, the leakage refers to that a gas leaks through the welding part in the vacuum state, and the rupture refers to that the welding part 61 is ruptured in a sample including the welding part 61 during a test of tensile strength. For the tensile strength, it can be seen that the welding part is ruptured at about 1000 MPa. Also, ○ indicates that welding is properly performed because no leakage or rupture occurs.

The experiments were performed on the following cases. First, the experiments were performed in cases where sizes of a laser beam are 200 μm, 375 μm, 625 μm, and 1125 μm. Also, the experiments were performed in various cases were the power of the laser beam is in a range from 100 W to 2000 W. Also, the experiments were performed in various cases where the moving speed of the laser beam is in a range from 3 m/min to 17 m/min.

Referring to FIG. 8, it can be seen that a leakage may occur even when no rupture occurs. This means that the welding part 61 may have a sufficient strength, but a leakage may occur at a specific portion due to instability of the welding part.

According to the above-described experiments, the size of the laser beam is preferably 200 to 375 μm, the moving speed of the laser beam is preferably 7 to 15 m/min, and the power of the laser beam is preferably 200 to 800 W. The most preferable welding control condition is a case where the three conditions are performed together. Through the above-described dimensions, it has been found that proper welding of the thin plate is performed when the welding is performed as the conduction mode welding and when the laser control condition is performed.

The laser control condition may further include various factors, but factors estimated by the present inventor will be described in detail. The power of the laser beam and the moving speed of the laser beam have influence on energy per unit area with respect to a portion onto which the laser beam is irradiated, and the irradiation area of the laser beam as beam size has influence on the size of the welding part.

When the same energy per unit area is applied, a correlation between the power of the laser beam and the moving speed of the laser beam will be further described. First, if the moving speed of the laser beam is increased, the power of the laser beam is to be increased so as to obtain the same energy per unit area. In this case, the work speed can be increased by increasing the moving speed of the laser beam. However, the power of the laser beam is extremely high, and therefore, it is highly likely that the mode welding will be performed as the keyhole mode welding.

In addition, the thin plate may be oxidized, and the base material may not be melted. Therefore, it is highly likely that a welding failure and a rupture will occur. On the contrary, if the moving speed of the laser beam is decreased, the power of the laser beam is to be decreased so as to obtain the same energy per unit area. In this case, the opposite effect may occur. For example, the productivity may be lowered due to the decreased moving speed, and the solidified part may not be provided in an appropriate form due to long-term flow of the molten part. If the size of the laser beam is increased, an excessively large amount of transfer energy is provided.

Hence, the mode welding may be performed as the keyhole mode welding, and the length 1 of the molten part 611 is increased as the width of the welding part 61 is excessively increased. Accordingly, it is highly likely that a failure will occur at the welding part 61 due to the increased width of the welding part 61. Also, if the size of the laser beam is extremely small, the amount of the transfer energy is small, and therefore, the thin plate and the base material are not sufficiently melted.

While performing the above-described various experiments under such circumferences, the present inventor has found that the performance of the welding part is influenced by how the molten part in the liquid state is flowed and then solidified after the thin plate or the base material is melted. Here, the performance of the welding part is first influenced by that any leakage occurs at the welding part. Also, it is secondly considered that the welding part is to have a predetermined strength or more.

First, properties of the molten part 611, which have been found by the present inventor, will be described. The molten liquid provided as the thin plate 112 and a partial thickness of the base material 111 placed under the thin plate 112 are melted has a flowable state, and the volume of the molten liquid is slightly expanded as the state of the molten liquid is changed from a solid phase to a liquid phase. The expanded molten liquid is solidified while flowing in rear and side directions based on the advancing direction of the laser beam. At this time, as the width and depth of the molten part 611 become longer, the inside of the molten part 611 is slowly solidified, and hence the molten part 611 is entirely solidified late.

Moreover, the flow amount of the molten liquid is large, and hence the molten liquid 611 flows in an unnecessary place. Therefore, a portion at which the molten part 611 does not locally connect the base material and the thin plate is provided, which may result in leakage. In this case, it can be seen that shapes of beads are not regular. In addition, the strength of the welding part may be lowered because the width and thickness of the solidified part 612 are large, and the occurrence of leakage caused by air pressure because of the length of the molten part 611 becomes long. On the contrary, as the width and depth of the molten part 611 become shorter, the molten part 611 is rapidly solidified.

Hence, the flow amount of the molten liquid is entirely small, and therefore, the molten liquid may not be melted enough to be filled in the thin plate and the base material. As can be expected, the width and depth of the molten part 611 may be increased as the energy of the laser beam per unit area and the size of the laser beam are increased. Under the above-described circumstances, it can be seen that the shape of the solidified part 612 formed by the molten part 611 having an appropriate flow amount of the molten liquid is provided as follows.

FIG. 9 is a view showing the shape of a solidified part when the width and thickness of a molten part are large. FIG. 10 is a view showing the shape of a solidified part when the width and thickness of a molten part are small. In the shapes of the two solidified parts, it is determined that each of the solidified parts has no leakage and an appropriate tensile strength. For example, referring to FIG. 8, the solidified part of FIG. 9 illustrates a case where the molten part is provided in a state in which the power of the laser beam is 960 W, the moving speed of the laser beam is 15 m/min, and the size of the laser beam is 375 µm, and the solidified part of FIG. 10 illustrates a case where the molten part is provided in a state in which the power of the laser beam is 240 W, the moving speed of the laser beam is 7 m/min, and the size of the laser beam is 200 µm.

Referring to FIGS. 9 and 10, the shapes of beads 620 and 630 shown in the solidified parts may include inflection regions 621 and 631 provided in a parabolic shape at centers of the molten parts, linear regions 622 and 632 provided in shapes corresponding to each other at both sides with respect to the inflection regions 621 and 631, and edge regions 623 and 633 provided at ends of the linear regions 622 and 632, respectively. Here, the bead refers to unevenness formed at the time when the molten liquid is solidified. It can be seen that the number of beads is increased as the width and length of the molten part are decreased.

It can be seen that, as the width and length of the molten part become shorter, the width of each of the inflection regions 621 and 631 is increased, the length of each of the linear regions 622 and 632 is decreased, and the angle θ made by the linear region and the advancing direction of the laser beam is increased. In each of the edge regions 623 and 633, it is difficult to define its angle due to a no-slip condition with a portion that is not melted. The width of each of the inflection regions 621 and 631 and the length of each of the linear regions 622 and 632 are considerably changed in all samples by the size of the laser beam, and therefore, it is difficult to understand their characteristics.

The present inventor has confirmed that the angle made by each of the linear regions 622 and 623 and the advancing direction of the laser beam and the number of beads included in the unit length of the solidified part can be defined. In FIG. 9, it has been observed that the angle made by each of the linear regions 622 and 623 and the welding direction is 9.462 degrees, and the number of beads is about 20 per 1 mm. In FIG. 10, it has been observed that the angle made by each of the linear regions 622 and 623 and the welding direction is 42.184 degrees, and the number of beads is about 100 per 1 mm. The shape of the solidified part, in which no leakage occurs at the welding part and the welding is stably performed, can be defined by the angle made by the linear region and the welding direction and the number of beads. As specific dimensions, the angle made by the linear region and the welding direction may be defined as 9 to 43 degrees, and the number of beads may be provided as 20 to 100. All shapes of the solidified part of the welding part are preferably provided within a range of the dimensions.

The dimensions will be again described for convenience of understanding. Lower limits with respect to the angle made by the linear region and the welding direction and the number of beads may mean that a portion at which the molten part does not locally connect the base material and the thin plate is provided because the flow amount of the molten liquid is large, i.e., that leakage locally occurs while the welding part having a length of a few tens of meters is being welded. Upper limits with respect to the angle made by the linear region and the welding direction and the number of beads may mean that the molten liquid is not melted enough to be filled in the thin plate and the base material because the flow amount of the molten liquid is small, i.e., that the molten liquid is not filled in the thin plate and the base material while the welding part having a length of a few tenths of meters is being welded, or leakage may entirely occur due to the generation of a portion at which the base material is not locally melted.

FIG. 11 is a view showing shapes of solidified parts as results obtained by performing an experiment while changing the power and moving speed of the laser beam using a beam size of 200 µm. Referring to FIG. 11, it can be seen that beads are regularly provided, and the solidified parts having beads with the above-described shapes have no leakage.

Referring to FIG. 11, it can be supposed that the beads of the solidified part are not regularly provided because an appropriate liquidity is not ensured as the flow of the molten part is excessively large or small. However, it can be seen that leakage locally occurs in a predetermined length even when the solidified part is regularly provided. This is, for example, a case where the laser beam having a power of 240 W is applied at 10 m/min. At this time, it can be seen that no leakage occurs when the experiment is performed using a short sample, but leakage locally occurs when the experiment is performed using a relatively long sample. In this case, it can be seen that the thickness of the solidified part also has influence on the stability of the welding part when the base material is not locally melted. To this end, it is required to consider the minimum thickness of the solidified part, with which the base material can be necessarily melted.

FIG. 12 is a graph showing depths of the welding part with respect to the energy per unit area. In FIG. 12, the horizontal axis represents strengths (W/m2T) of the energy per unit area, and the vertical axis represents, as dimensionless numbers, welding depths of the welding part as compared with thicknesses of the thin plate.

Referring to FIG. 12, as already described above, the energy per unit area is a value in proportion to the power of the laser beam and the moving speed of the laser beam. The energy per unit area can be obtained through the two dimensions. If the energy per unit area is increased, the mode welding is performed as the keyhole mode welding, and therefore, a welding failure may occur, which is not preferable. Accordingly, the energy applied in the mode welding does not preferably reach that applied in the keyhole mode welding.

FIG. 13 is a graph showing tensile strengths with respect to depths of the welding part. Referring to FIG. 13, it can be seen that, in various experiments, the tensile strength of the welding part is rapidly decreased when the depth of the welding part exceeds 200 μm.

Referring to FIGS. 12 and 13, it can be seen that, when the depth of the thin plate is 50 the tensile strength of the welding part is rapidly decreased from when the depth of the welding part exceeds 200 μm. Therefore, the depth of the base material to be melted does not preferably exceed three times of that of the thin plate. Also, the depth of the base material to be melted is preferably a minimum of 1/10 of that of the thin plate. The minimum depth of the base material to be melted is provided such that there is generated no portion at which the base material is not locally melted. Accordingly, the above-described dimensions are satisfied, so that the above-described laser control condition can be achieved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The embodiment may be preferably applied to the doorside vacuum adiabatic body of the refrigerator. However, resistances against the force caused by the vacuum pressure and the force caused by the frictional force are the same in the main body of the refrigerator or the pipeline passing through the vacuum adiabatic body, and therefore, the embodiment may be identically applied.

According to the present disclosure, it is possible to stably and uniformly provide the welding part essentially provided to fabricate the refrigerator to which the vacuum adiabatic body is applied. Accordingly, it is possible to further improve the technique of providing the refrigerator using the vacuum adiabatic body.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A refrigerator comprising:
a main body defining an internal space; and
a door provided to open and close the main body,
wherein at least one of the main body or the door comprises a vacuum adiabatic body, and
wherein the vacuum adiabatic body comprises:
a first plate defining at least one portion of a first side of a wall adjacent to the internal space having a first temperature;
a second plate defining at least one portion of a second side of the wall adjacent to an external space having a second temperature; and
a conductive resistance sheet that connects the first plate to the second plate to define a vacuum space between the first plate and the second plate that has a third temperature between the first temperature and the second temperature, the conductive resistance sheet being capable of resisting heat conduction between the first plate and the second plate, wherein the conductive resistance sheet is welded to each of the first and second plates to define first and second welding parts, wherein a plurality of regular beads are provided to a surface of each of the welding parts, and wherein each of the regular beads comprises:
a parabolic inflection region provided at a center portion of a regular bead;
a first linear region extending from a first side of the parabolic inflection region and a second linear region extending from a second side of the parabolic inflection region; and
a first edge region provided at an end of the first linear region opposite the parabolic inflection region and a second edge region provided at an end of the second linear region opposite the parabolic inflection region.

2. The refrigerator according to claim 1, wherein an angle between the linear region and a welding direction is greater than or equal to 9 and less than or equal to 43 degrees.

3. The refrigerator according to claim 1, wherein a number of regular beads is greater than or equal to 20 and less than or equal to 100 per 1 mm, based on a welding direction.

4. The refrigerator according to claim 1, wherein a thickness of each of the first and second plates to be melted as a part of each of the welding parts is 0.1 to 3 times a thickness of the conductive resistance sheet.

5. The refrigerator according to claim 1, wherein each of the welding parts is created through laser welding.

6. The refrigerator according to claim 5, wherein, as a control condition of the laser welding, a size of a laser beam is greater than or equal to 200 and less than or equal to 375 µm, a moving speed of the laser beam is greater than or equal to 7 and less than or equal to 15 m/min, and a power of the laser beam is greater than or equal to 200 and less than or equal to 800 W.

7. The refrigerator according to claim 1, wherein the regular beads are provided as a consistent pattern.

8. A refrigerator comprising:
a main body defining an internal space in which goods are stored; and
a door provided to open and close the main body, wherein at least one of the main body or the door comprises a vacuum adiabatic body, and wherein the vacuum adiabatic body comprises:
a first plate defining at least one portion of a first side of a wall adjacent to the internal space having a first temperature;
a second plate defining at least one portion of a second side of the wall adjacent to an external space having a second temperature; and
a conductive resistance sheet that connects the first plate to the second plate to define a vacuum space between the first plate and the second plate that has a third temperature between the first temperature and the second temperature, the conductive resistance sheet being capable of resisting heat conduction between the first plate and the second plate,
wherein the conductive resistance sheet is welded to each of the first and second plates to define first and second welding parts,
wherein each of the welding parts is created through laser welding as conduction mode welding, and
wherein a thickness of each of the first and second plates to be melted at each of the welding parts is 0.1 to 3 times a thickness of the conductive resistance sheet.

9. The refrigerator according to claim 8, wherein, in order to create each of the welding parts, a moving speed of a laser beam is 7 to 15 m/min, and a power of the laser beam is 200 to 800 W.

10. The refrigerator according to claim 8, wherein a bead created on a surface of each of the welding parts comprises linear regions.

11. The refrigerator according to claim 8, wherein the conductive resistance sheet has a thickness of 10 to 200 µm, and each of the first and second plates has a thickness of 500 to 2000 µm.

12. The refrigerator according to claim 11, wherein the thickness of each of the first and second plates is 10 to 100 times the thickness of the conductive resistance sheet.

13. A refrigerator comprising:
a main body defining an internal space in which goods are stored; and
a door provided to open and close the main body, wherein at least one of the main body or the door comprises a vacuum adiabatic body, and wherein the vacuum adiabatic body comprises:
a first plate defining at least one portion of a first side of a wall adjacent to the internal space having a first temperature;
a second plate defining at least one portion of a second side of the wall adjacent to an external space having a second temperature; and
a conductive resistance sheet that connects the first plate to the second plate to define a vacuum space between the first plate and the second plate that has a third temperature between the first temperature and the second temperature, the conductive resistance sheet being capable of resisting heat conduction between the first plate and the second plate,
wherein the conductive resistance sheet is welded to each of the first and second plates to define first and second welding parts, and wherein a ratio (d/L) of a distance (d) from one of the welding parts to an end of one of the first or second plates to a distance (L) of the conductive resistance sheet exposed to the vacuum space is greater than or equal to 0.6.

14. The refrigerator according to claim 13, wherein the ratio (d/L) of the distance (d) from the one of the welding parts to the end of the one of the first or second plates to the distance (L) of the conductive resistance sheet exposed to the vacuum space is less than or equal to 1.

15. The refrigerator according to claim 13, wherein a portion of the conductive resistance sheet exposed to the vacuum space is curved to increase heat resistance.

16. The refrigerator according to claim 13, wherein each of the welding parts is created as a line through laser welding.

17. The refrigerator according to claim 16, wherein the laser welding is performed as conduction mode welding.

* * * * *